United States Patent [19]
Yamaguchi

[11] Patent Number: 5,282,046
[45] Date of Patent: Jan. 25, 1994

[54] COLOR IMAGE FORMING APPARATUS HAVING A COLOR-CORRECTING UNIT

[75] Inventor: Toshiyuki Yamaguchi, Toyoake, Japan

[73] Assignee: Brother Kogyo Kabushiki Kaisha, Nagoya, Japan

[21] Appl. No.: 735,332

[22] Filed: Jul. 24, 1991

[30] Foreign Application Priority Data

Jul. 25, 1990 [JP] Japan .................................. 2-196588
Sep. 10, 1990 [JP] Japan .................................. 2-240749

[51] Int. Cl.⁵ ......................... H04N 1/387; G03F 3/08
[52] U.S. Cl. ..................................... 358/296; 358/518
[58] Field of Search ................... 358/296, 302, 75, 76, 358/78, 80; 395/109

[56] References Cited
U.S. PATENT DOCUMENTS

| | | | |
|---|---|---|---|
| 4,458,265 | 7/1984 | Yoshida et al. | 358/80 |
| 4,670,780 | 6/1987 | McManus et al. | 358/80 |
| 4,796,086 | 1/1989 | Ohta et al. | 358/80 |
| 4,839,722 | 6/1989 | Barry et al. | 358/80 |
| 4,875,032 | 10/1989 | McManus et al. | 358/80 X |
| 4,941,038 | 7/1990 | Walowit | 358/80 |
| 4,941,039 | 7/1990 | E'Errico | 358/80 |
| 4,958,220 | 9/1990 | Alessi et al. | 358/76 |
| 4,959,711 | 9/1990 | Hung et al. | 358/80 |
| 4,972,257 | 11/1990 | Birnbaum et al. | 358/80 |
| 5,086,339 | 2/1992 | Guasland | 358/80 X |
| 5,105,469 | 4/1992 | MacDonald et al. | 358/80 X |

Primary Examiner—Benjamin R. Fuller
Assistant Examiner—Eric Frahm
Attorney, Agent, or Firm—Oliff & Berridge

[57] ABSTRACT

An image forming apparatus for reproducing an original image with sufficient color reproducibility, including an image input unit for reading the original color image on an image input medium to input an color image data of the original image therethrough, an image recording unit for recording the color image on the image output medium on the basis of the color image data, a memory for storing plural groups of combination data of colors to be recorded by the image recording means and control signals for controlling the image recording means to record the colors, the plural groups of combination data being different from one another, a selecting unit for suitably selecting one of the plural groups of combination data in accordance with at least one of a kind of the image input medium and a color distribution of the original color image on the image input medium, and a color-correcting unit for obtaining a suitable control signal for the color image data of the original color image from the selected one of the plural groups to perform a color-compression processing for the color image data of the original color image.

28 Claims, 11 Drawing Sheets

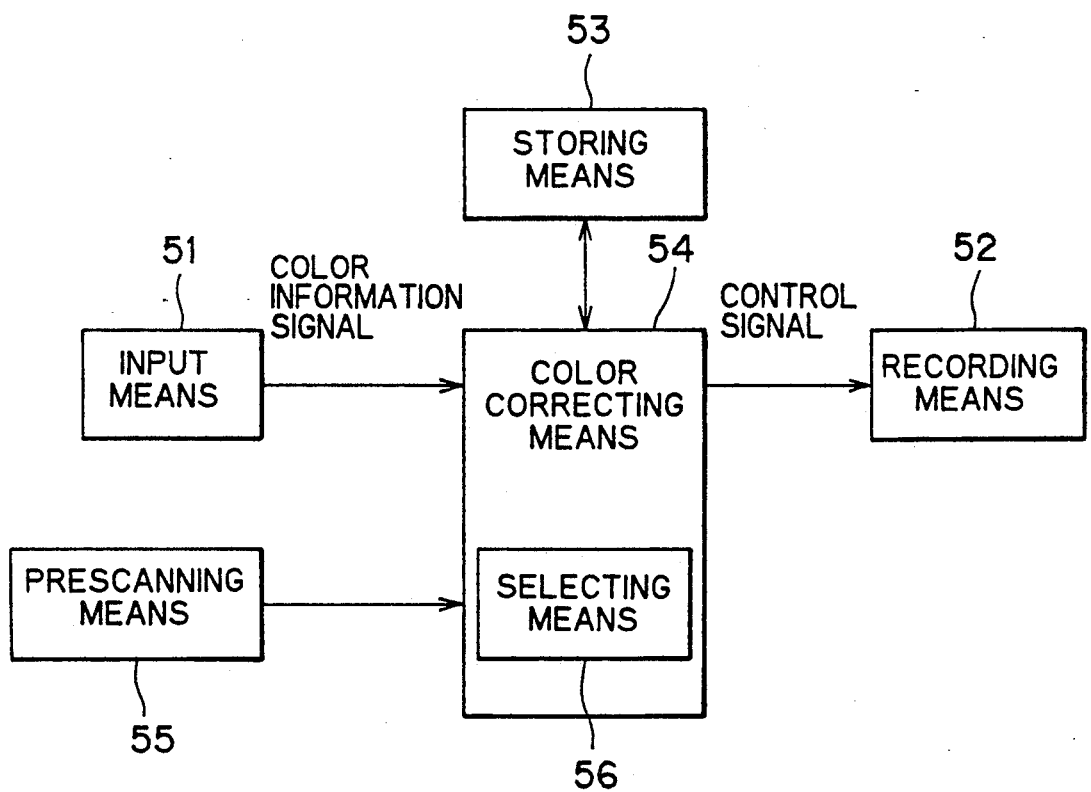

COLOR IMAGE FORMING APPARATUS HAVING A COLOR-CORRECTING UNIT

BACKGROUND OF THE INVENTION

This invention relates to a color image forming apparatus, and more particularly to a color image forming apparatus having a color-correcting processing.

There has been known an image forming apparatus in which an original color image on an image input medium such as a color photographic film, a television, a copy sheet or the like is read out by image reader to obtain an original image data. The original image data is separated into three color components (red, green and blue image data) for every picture element, and the original image is reproduced on the basis of the separated color image data. In such an apparatus, inconsistency in color (color error or color difference) between the original image and the reproduced image frequently occurs when a color-reproducible range (gamut) of the image input medium is inconsistent with that of an image output medium such as a copying sheet, a color television or the like. That is, a color located within the color-reproducible range (gamut) of the image input medium is not completely reproduced, and in other words, the color is reproduced with insufficient color-reproducibility when the color of the image input medium is out of the color-reproducible range (gamut) of the image output medium. Here, each of the image input media and the image output media is defined as a medium on which a visible image is formed or supported. The medium is referred to as "image input medium" when the medium is used as an original from which an original image is read by the image reading unit, while the medium is referred to as "image output medium" when the medium is referred to as "image output medium" when the medium is used as a recording medium to which the original image is recorded or reproduced. When the recording medium having an image thereon is used as an original, the recording medium is referred to as "image input medium". Therefore, various techniques (color-correcting techniques) for correcting an input color image data have been utilized to correct such a color-inconsistency (decrease such a color error) and improve the color-reproducibility of the original image.

One of the known color-correcting techniques is a color compression technique (a data-compression transform technique). In the data-compression transform technique, a color representation by an arbitrary color information signal is compressed in an achromatic (neutral) color direction under an invariable compression rule to obtain a color which can be recorded or reproduced on an image output medium such as a copy sheet, a television, a coated or non-coated sheet or the like by a recording means, and then a control signal for driving the recording means to record or reproduce the color-compressed color which has been previously produced as compressed data. Thereafter, data on plural combinations of the color information signals and the corresponding control signals thus obtained have been previously stored in a memory. In this state, a control signal for any color information signal of an original image input by an input means is produced using interpolative method or the like on the basis of the data stored in the memory in a color recording process, and then a color recording operation is carried out using cyan, magenta, yellow inks or toners by the recording means in accordance with the obtained control signal.

Here, the achromatic color is defined as a color having a lightness, but no hue and chromaticness (saturation). White, gray and black colors belong to the achromatic color, and are decreased in lightness in this order. In the following description, a color axis on which achromatic colors having various lightnesses (white, gray and black) are located is referred to as "achromatic color axis". Further, the achromatic color direction is defined as a direction in which any color is directed to an achromatic color on the achromatic axis in a color space. As described below, the color-compression process is a data-correcting process for shifting (color-compressing) a color within the color-reproducible range (gamut) of an image input medium to a color within the color-reproducible range (gamut) of an image output medium in the color space.

FIG. 1 shows color-reproducible ranges of various general image input and output media such as a photographic color film, an ink jet, a color print and so on in a chromaticity diagram of CIE-XYZ (CIE 1931 standard) colorimetric system. The color-reproducible ranges of the image input and output medium are defined as areas outlined by a solid line, a dotted line and so on in the chromaticity diagram as shown in FIG. 1. In the chromaticity diagram, an achromatic color is represented by a point C (x=0.33, y=0.33), and is located on the achromatic color axis. The achromatic color axis extends in a direction vertical to the X-Y plane of the chromaticity diagram, and has both ends representing white and black color. The achromatic color on the achromatic color axis is shifted up to the white color as a lightness thereof is increased, and down to the black color as the lightness is decreased.

As is apparent from FIG. 1, the color-reproducible ranges of the image input and output medium are different in accordance with kinds of the image input and output medium. Accordingly, in order to record or reproduce an original image whose color is within a color-reproducible range of the image input medium, but is out of a color-reproducible range (gamut) of the image output medium, it is necessary to correct a color image data of the original image such that the color of the original image is shifted to a suitable color within the color-reproducible range (gamut) of the image output medium in the chromaticity diagram (color space). In general, the original image data is corrected such that the color of the original image is shifted toward a point on the achromatic color axis and is located at a point within a color-reproducibility of the image output medium. This color-correcting process is hereinafter referred to as "an color-compression process in an achromatic color direction". In the conventional image forming apparatus adopting the above color-compression process, an color-correcting data with which an input image data is color-corrected, is beforehand determined to an invariable data (invariable data on combinations of the color information signals and the control signals) by the predetermined invariable compression rule, and is previously stored in a memory of the apparatus.

Therefore, in the conventional image forming apparatus adopting the color-compression process, there frequently occurs that the data-compression process (color-correcting process) can not be sufficiently performed for some kinds of the image inputting systems because the invariable data is determined using a particular image input or output medium, and the reproduced color is inconsistent in hue or lightness with the original color when the original color is out of the color-reproducibility range (gamut) of the image output medium (that is, the color-reproduciblity range (gamut) of the image input medium is inconsistent with that of the image output medium).

Further, in general, an original color image has an inherent ratio of recordable color region and a unrecordable color region by the recording means (an inherent ratio of colors which can be recorded by the recording means and other colors which can not be recorded by the recording means), and an inherent degree of unrecordable color for every original color image. That is, each of the original color images has an inherent color distribution and thus a different color distribution from each other. The conventional compression technique as described above subjects all of the original images to the predetermined invariable compression process utilizing the invariable color-correcting data irrespective of the difference of the color distribution of the original color images, and thus causes some original images to be reproduced with insufficient contrast due to an excessive color-compression or to be reproduced with saturation colors due to insufficient color-compression, with the result that a sufficient color reproducibility is not obtained.

SUMMARY OF THE INVENTION

An object of this invention is to provide an image forming apparatus capable of reproducing a color image having a color out of the color-reproducible range (gamut) of an image output medium with sufficient color-reproducibility.

Another object of this invention is to provide an image forming apparatus capable of reproducing a color image with excellent color-reproducible irrespective of a color distribution of an original image.

In order to attain the above objects, an image forming apparatus according to this invention in which an original color image on an image input medium having a first gamut defined as a color-reproducible range is read out to obtain a color image data representing original color of the original color image every picture element and then a color image on an image output medium having a second gamut is formed on the basis of the color image data, comprises image inputting means for reading the original color image on the image input medium to input an color image data of the original image therethrough, image recording means for recording the color image on the image output medium on the basis of the color image data, storing means for storing plural groups of combination data of colors to be recorded by the image recording means and control signals for controlling the image recording means to record the colors, the plural groups of combination data being different from one another, selecting means for suitably selecting one of the plural groups of combination data in accordance with at least one of a kind of the image input medium and a color distribution of the original color image on the image input medium, and color-correcting means for obtaining a suitable control signal for the color image data of the original color image from the selected one of the plural groups to perform a color-compression processing for the color image data of the original color image.

BRIEF DESCRIPTION OF THE DRAWINGS

FIG. 9 is a block diagram for showing a second embodiment of the image forming apparatus of this invention;

DETAILED DESCRIPTION OF THE INVENTION

Figure 1:
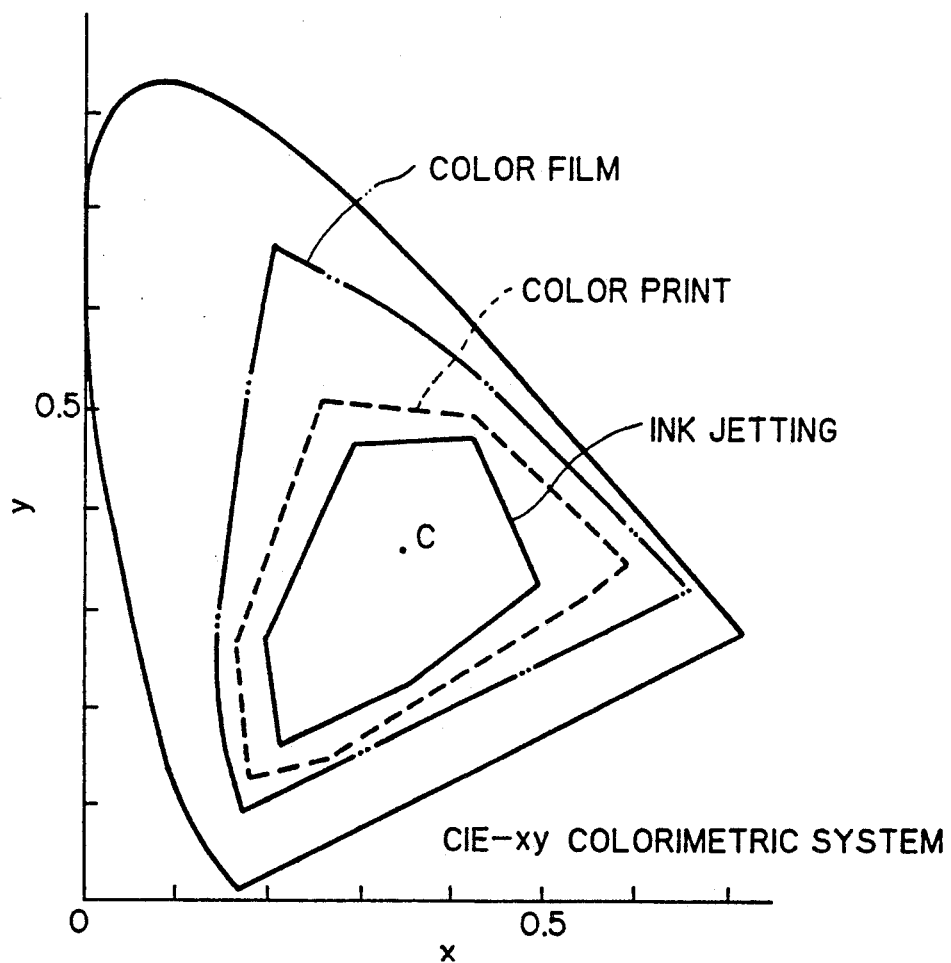
FIG. 1 shows color-reproducible ranges of various prior art image inputting systems in a chromaticity diagram.
Figure 2:
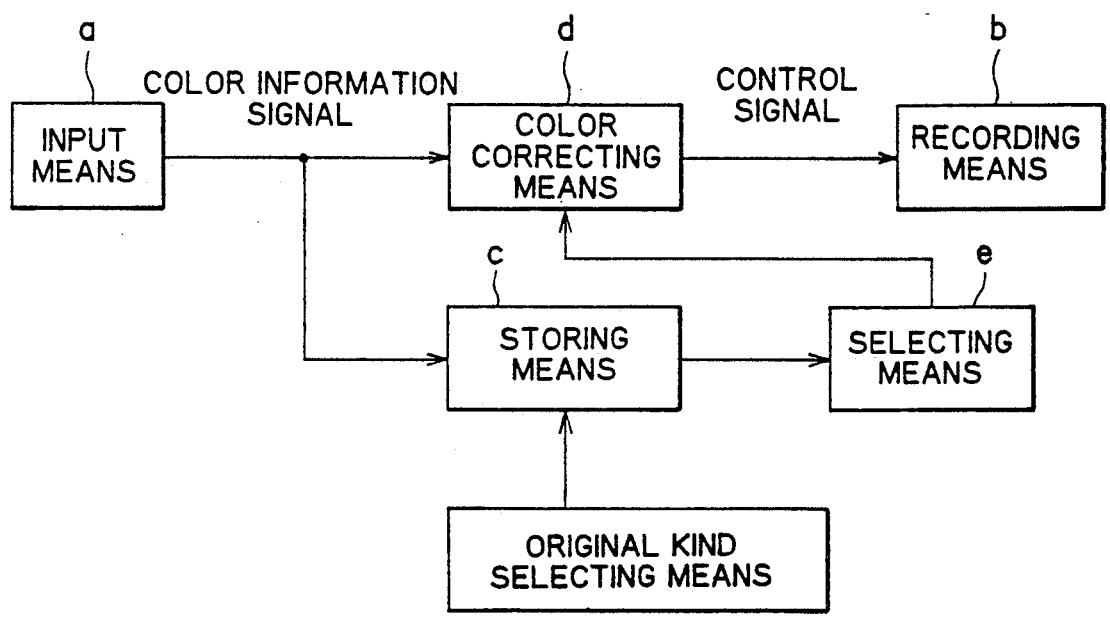
FIG. 2 is a block diagram of a first embodiment of an image forming apparatus of this invention.

FIG. 2 is a block diagram of the basic construction of a first embodiment of a color image recording apparatus of this invention.

The color image recording apparatus basically includes an input means for inputting color information corresponding to a color of a color original, a recording means b for performing a color recording process using at least three coloring materials of cyan, magenta and yellow, a storing means c for storing data on combinations of colors to be recorded by the recording means b and control signals such as printer control signals for controlling the recording means b to record the colors ( a group of combination data), and a color correcting means d for obtaining a suitable control signal for the recording means b on the basis of the combination data stored in the storing means c in such a manner that a color to be recorded by the recording means b is substantially the same as a color of the input color information signal when the color information signal input through the input means starts the actuation of the recording means b, wherein the storing means c stores plural different groups of combination data in correspondence to the respective kinds of the originals which have an influence on the color of a color original image, and includes a selecting means e for selecting one of the different groups in accordance with the kind of the original.

Each group of combination data stored in the storing means c may be composed of plural combination data of both of original (input) color information signals and control signals for controlling the recording means b to record colors of the color information signals which are obtained by subjecting the original color information signals to a color-compression process in achromatic direction in a different manner or at a different degree for every kind of original, the colors being recordable by the recording means b.

In the image recording apparatus thus constructed, when a kind of a color original to be recorded is selected and a color information signal of the color original is input, a group of combination data on plural predetermined colors and control signals therefor which are previously stored in the recording means 52 are selected from plural groups of combination data in accordance with the selected kind of the color original, and a control signal for an input arbitrary color information signal is interpolatively calculated using the selected group of combination data. The recording means 52 performs a recording process using magenta, cyan and yellow inks or toners to thereby output a color-corrected recording image.

Figure 3:
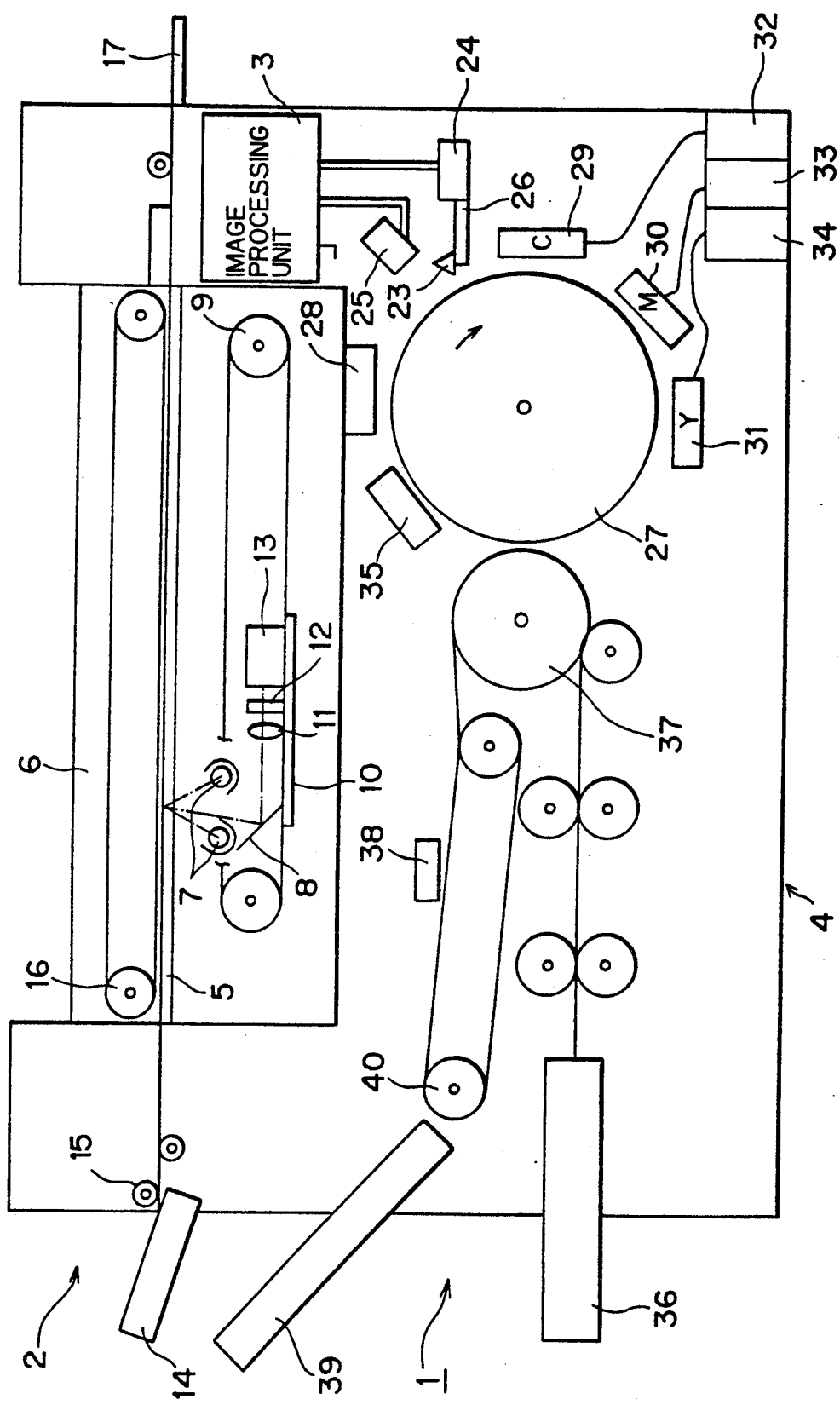
FIG. 3 shows a basic construction of the image forming apparatus used in the first embodiment.

FIG. 3 shows the representative construction of the first embodiment of the image forming apparatus as described above.

The image forming apparatus of this embodiment comprises a digital color copying machine 1, and includes an original color image reading system 2 provided on an upper side of the copying machine 1 and a color image processing system 3 provided at a right side of the copying machine 1, and a color image recording system 4 provided at a lower side of the copying machine 1.

The original color image reading system 2 includes a transparent original mount 5 for mounting an original thereon, an original cover 6 for pressingly covering the original mounted on the original mount 5, an original supply stand 14 for supplying the original to the original mount 5, an original supply unit 15 provided at a right side of the original supply stand 14 for supplying the original from the original supply stand 14 to the original mount 5, an original feeding unit 16 which comprises two rollers rotated by a motor (not shown) and an endless belt suspended therebetween for feeding the original through the original mount 5 at a constant speed, an original discharge tray 17 provided at a right side of the original feeding unit 16 for withdrawing an exposed original, and an image reading unit provided at a lower portion of the system 2 for exposing the original to light to obtain an original color image data from the original.

The image reading system 2 includes two light sources (e.g. fluorescent lamps) 7 each extending in a traversing direction to the original (in a main scanning direction) for emitting light toward the transparent original mount 5 and irradiating the light to the original fed on the original mount 5 while scanning the original with the light, a movable reflection mirror 8 for reflecting an original image light reflected from the original, a lens 11 for converging the original image light from the reflection mirror 8, a color filter 12 for separating the original image light from the lens 11 into three (red, green and blue) color image components, and a solid-state image pick-up element (e.g. a line charge-coupled device (line CCD)) 13 provided behind the color filter 12 for receiving the original image light having the separated three color components and forming an original color image data on the basis of the original image light. If the solid-state image pick-up element 13 comprises a line CCD, the line CCD reads out an image information every line in a width direction of the original (vertically to the drawing). The light sources 7, the movable reflection mirror 8, the lens 11, the color filter 12 and the solid-state image pick-up element 13 are mounted on a movable stand 10 which is moved by a moving unit 9 such as a rotatable roller in right and left directions (in an auxiliary scanning direction) in FIG. 2.

Figure 4:
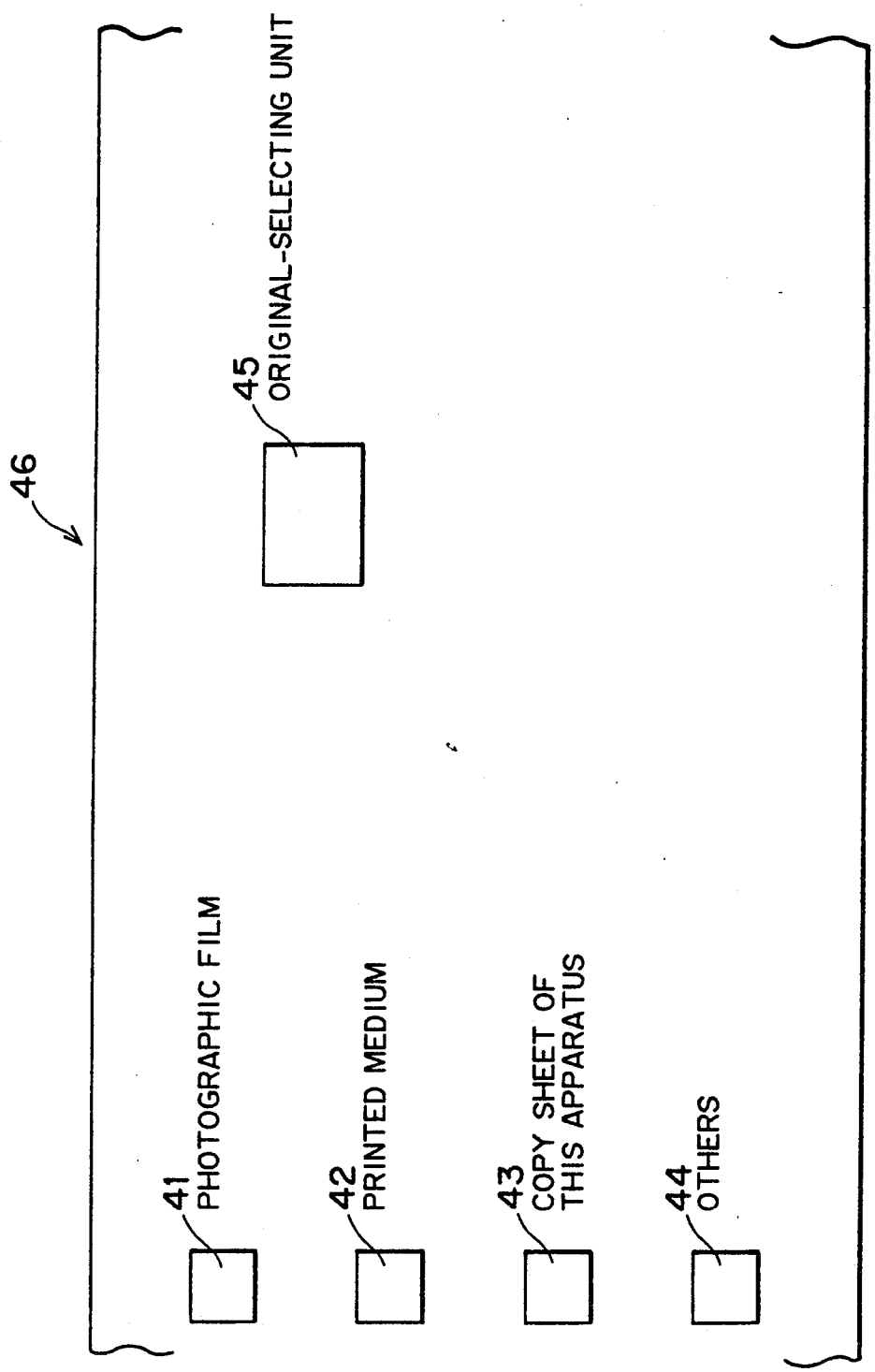
FIG. 4 shows an operation panel having an original-selecting unit.

At a right side of the original cover 6 is provided an operation panel 46 having a copy starting switch or button 45 and various original-selecting switches or buttons such as a photographic original switch or button 41, a printed original switch or button 42, a copy sheet switch or button 43 and other switches buttons 44 as shown in FIG. 4.

Figure 5:
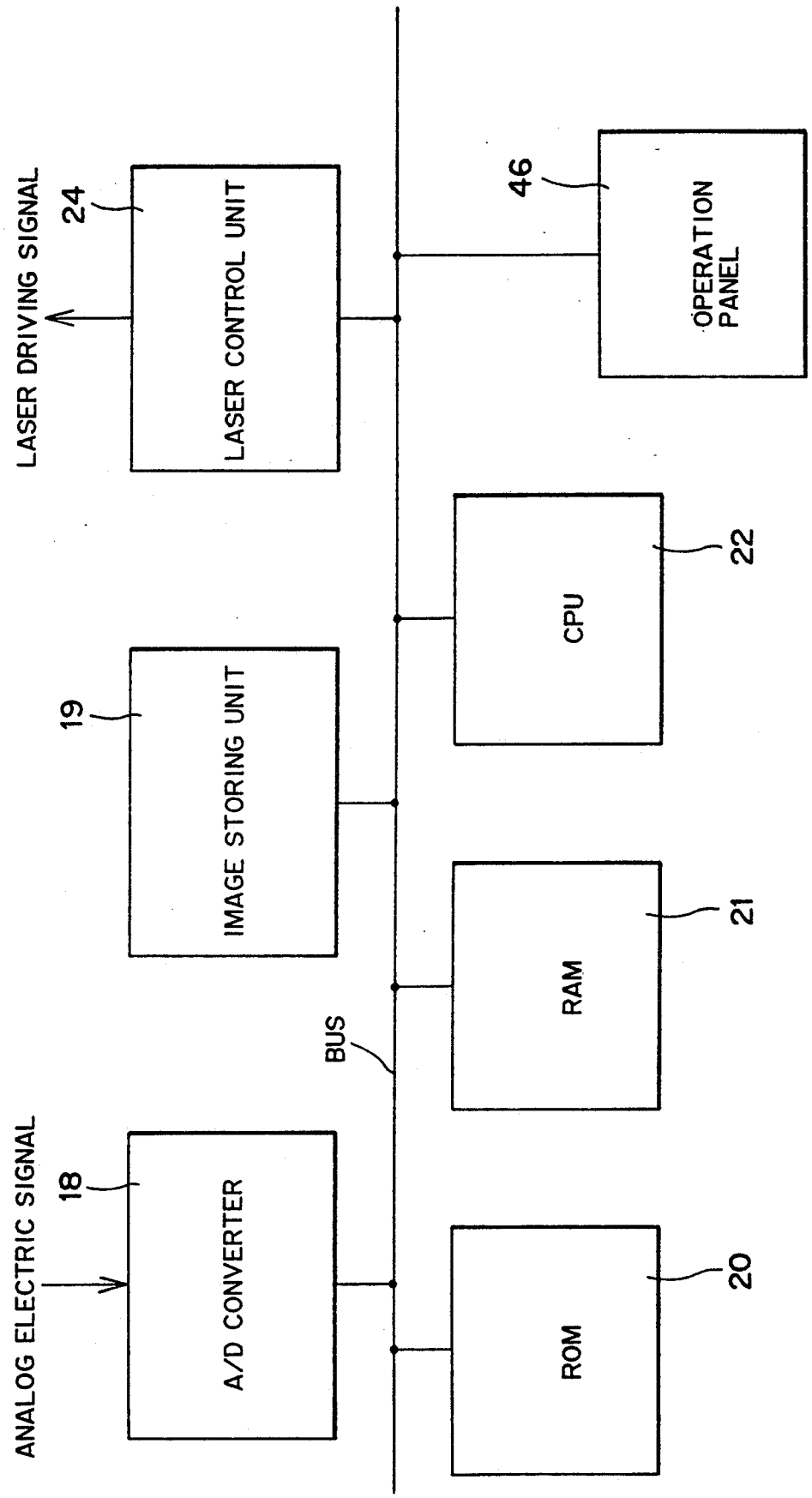
FIG. 5 is a block diagram for showing a color image processing system.
Figure 6:
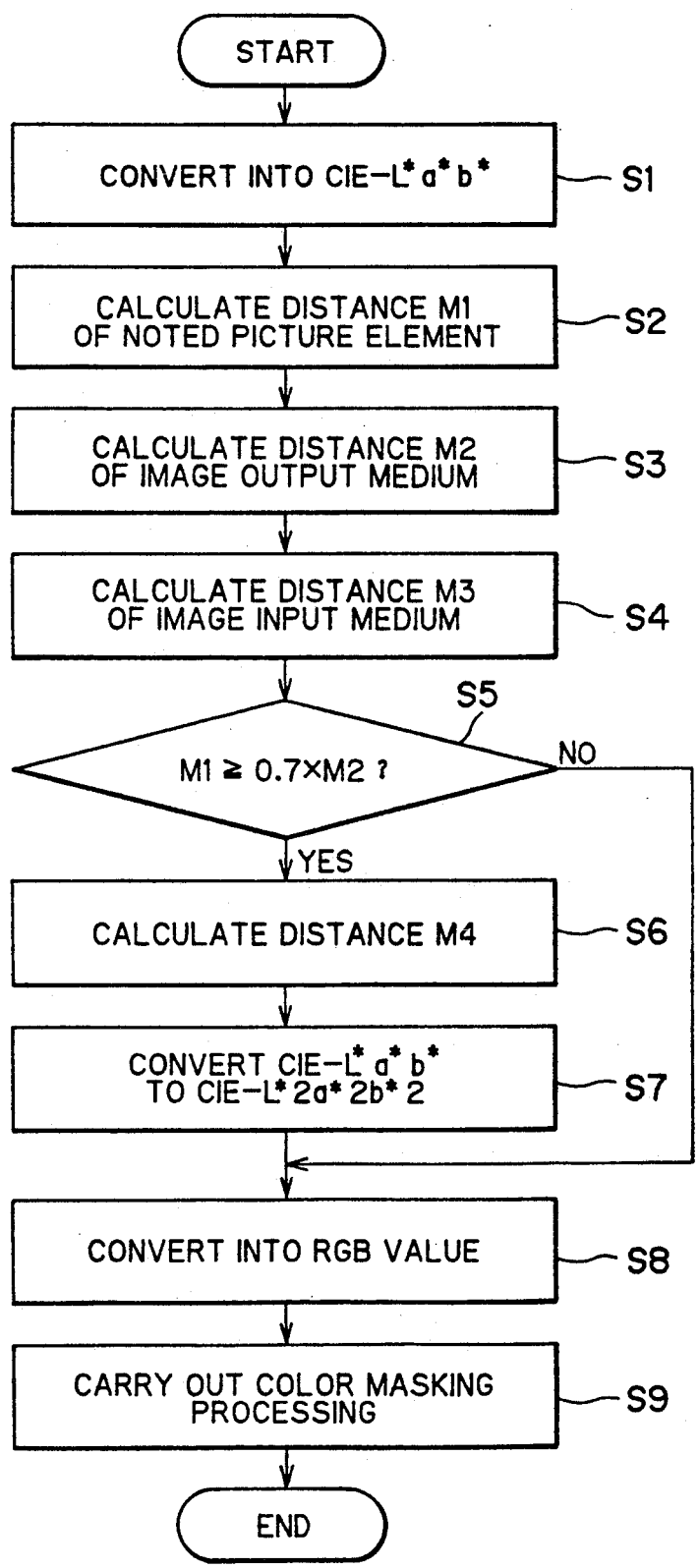
FIG. 6 is a flowchart for showing a color-correcting process.

FIG. 5 is a block diagram for showing the color image processing system 3.

As shown in FIG. 5, the color image processing system 3 comprises an analog-to-digital (A/D) converter 18 for converting the original color image data (color information signal) of the solid-state image pick-up element 13 into digital color image data, an image storing unit such as an image memory or a frame memory 19 for storing all or a part of the original color image data in a digital form, a ROM 20 serving as storing means for previously storing therein various combinations of predetermined colors to be recorded and plural control signals for a printer or the like and in correspondence to the kinds of the originals and a table indicating color-reproducible ranges for various kinds of image input mediums (originals) and the image output mediums (mediums on which an original image is formed), and another table indicating a color-reproducible range of the image forming apparatus itself, and color-correcting coefficients which are previously determined to perform a sufficient color reproduction for a color within a color-reproducible range (gamut) of the color image recording system 4, a RAM 21 for storing various data indicating various processing results, a CPU 22 for performing various image processing using the RAM 21, and a laser control unit 24 for generating a laser driving signal on the basis of a color-corrected image data to control the driving of a laser source 23 such as a laser diode of the image recording system 4. These elements are connected to one another through a bus, and further connected to the operation panel 46 through the bus.

The image pick-up element 13 is successively covered by the filter unit 12 to successively pass one of red, green or blue color components to the image pick-up element 13 for every image reading operation of one line or one frame, so that image signals each representing lightness of each of three color components of each picture element is outputted from the image pick-up element 13 for every picture element. Each of the outputted three image signals of each picture element represents a lightness, and a group of the outputted image signals of the three color components of each picture element constitutes a color data of lightness, hue and saturation of each picture element. The outputted image signals are converted into digital image signals by the A/D converter 18, and stored in the image storing unit 19.

The color image recording system 4 includes the laser diode 23 for emitting a laser beam, a laser modulation unit 26 for modulating the laser beam of the laser source 23 such as a laser diode on the basis of the laser driving signal from the laser control unit 24 and supplying the modulated laser beam to a polygon mirror 25, an electrophotographical image forming unit for electrostatically forming a latent image thereon through an exposing operation using the modulated laser beam which is reflected from the polygon mirror 25 and then forming a visible image corresponding to the latent image on a recording sheet with toners, a fixing unit 38 for fixing the visible image on the sheet, and a sheet feeding unit 40 for discharging the fixed sheet to a discharge tray 39.

The electrophotographic image forming unit includes a photosensitive drum 27 on which the latent image is electrophotographically formed by the modulated laser beam from the polygon mirror 25, a charging unit 28 provided near the photosensitive drum 27 for charging the photosensitive drum 27 homogeneously negatively or positively before the exposing operation, a developer unit for coating the latent image with color toners to form a toner image on the photosensitive drum 27, the developer unit comprising a cyan developer 29 for coating cyan toners to a latent image which has been formed on the basis of a cyan color image data, a magenta developer 30 for coating magenta toners to a latent image which has been formed on the basis of a magenta color image data and a yellow developer 31 for coating yellow toners to a latent image which has been formed on the basis of a yellow color image data, a toner supply unit comprising a cyan toner tank 32 for supplying the cyan toners to the cyan developer 29, a magenta toner tank 33 for supplying the magenta toners to the magenta developer 30 and a yellow toner tank 34 for supplying the yellow toners to the yellow developer 31, a cleaner 35 provided near to the photosensitive drum 27 for removing undesired toners on the photosensitive drum 27 after a transfer process, and a transfer drum 37 for transferring the toner images of cyan, magenta and yellow on the photosensitive drum 27 to a recording sheet which is supplied from a sheet supply case 36.

A color image forming operation of the digital color image copying machine of this embodiment will be next described.

First, a kind of an original (an image inputting system) to be copied is selected by pushing one of the original-selecting buttons 41 to 44 on the operation panel 46, and then the copy starting button 45 is pushed.

In response to the pushing operation of the copy starting button 45, a color original on the original supply stand 14 is fed to the transparent original mount 5 by the original feeding unit 16 (the original may be manually placed on the original mount 5 by opening the original cover 6). Thereafter, a white light is irradiated from the light sources 7 to the original mount 15 while scanned on the original in an auxiliary scanning direction by the moving unit 9, and is reflected from the movable reflection mirror 8 through the lens 11 and the filter unit 12 to the image pick-up element 13, in which an original image light is converted into an electrical signal. A switching operation among the red, green and blue filters in the filter unit 12 is carried out every line or frame, and in other words the red, green and blue filters are supplied in front of the solid-state image pickup element 13 in this order every line or frame of the original.

The analog image signals for picture elements obtained by the solid-state image pickup element 13 are converted into digital image signals for every picture element (hereinafter, a picture element to be subjected to a color correction is referred to as "a noted picture element") in the A/D converter 18, and then the digital image signals are stored in the image storing unit 19. Thereafter, the following color-correcting processing is conducted for the digital signals of the noted picture elements stored in the image storing unit 19.

First, in accordance with a kind of the original which is selected by one of the original selecting buttons 41 to 44, a group of combination data of control signals and input colors is selected from the plural groups of combination data previously stored in the ROM 20. The combination data are stored in the ROM 20 such that each of control signals for predetermined colors to be recorded corresponds to a color located at a lattice point in a lattice space which is three-dimensionally represented by three components of the color, and these control signals are previously stored as a look-up table in correspondence to the predetermined colors. Next, a position of arbitrary input color represented by a digital signal of each noted picture element in the lattice space is obtained, and a control signal for the input color (that is, an arbitrary position of the lattice space) is interpolatively calculated using the control signals for the predetermined colors located at the lattice points. The interpolative processing is carried out using the following equation (1).

$$Di = \left( \sum_{j=1}^{8} (Mj \times Lij) \right) / \sum_{j=1}^{8} Mj \quad (1)$$

Here, Lij (i=C,M,Y) represents a control signal for a color located at a lattice point which is beforehand stored, Mj represents the volume of a rectangular parallelepiped in the lattice space which includes diagonal lattice points and the color represented by the digital signal of a noted picture element, and Di represents a control signal of the noted picture element which is obtained by the interpolative processing. A control signal of each component for driving the printer or the like, which has been obtained by the color correcting processing as described above, is transmitted to the laser control unit 24, and a laser light is emitted in accordance with the control signal. The laser light is reflected from the polygon mirror 25, and then irradiated to the photosensitive drum 27 which are homogeneously charged by the charger 28, thereby forming a latent image on the photosensitive drum 27.

The latent image on the photosensitive drum 27 is supplied with toners from one of the cyan, magenta and yellow developers 29, 30 and 31 in accordance with separated color components of the color data of the original image to thereby develop the latent image into a toner image. A recording sheet which has been supplied from the sheet supply case 36 is wound around the transfer drum 37, and then the developed toner image is transferred from the photosensitive drum 27 to the recording sheet. On the other hand, residual toners on the photosensitive drum 27 are removed by the cleaner 35. The recording sheet which has been subjected to a transfer operation is heat-fixed by the heat-fixing unit 38 by way of a sheet feeding operation of the sheet feed unit 40, and discharged to the output tray 39.

FIG. 5 is a flowchart for obtaining combination data of an input color and a control signal therefor which should be stored in the ROM 20.

A lattice color space is defined by homogeneously dividing a color space which represents an arbitrary color by three color components. A color (hereinafter referred to as "an objective color") in the lattice color space is converted into a value of CIE-L*a*b* color system in a step S1. That is, the color is converted to a value in a CIE 1976 colorimetric system (L*a*b* colorimetric system). If a Luther condition as disclosed by J. A. C. Yule, "Principle of Color Reproduction" is satisfied for the image reading unit, an input color (RGB color signals) can be linearly converted into a value in a CIE 1931 standard colorimetric system (XYZ colorimetric system). The value (X, Y, Z) in the CIE 1931 colorimetric system can be converted into a value (L*, a*, b*) in the CIE 1976 L*a*b* colorimetric system by the following equation.

$$L^* = 116 \times (Y/Yn)^{\frac{1}{3}} - 16 \quad (2)$$

$$a^* = 500 \times ((X/Xn)^{\frac{1}{3}} - (Y/Yn)^{\frac{1}{3}}) \quad (3)$$

$$b^* = 200 \times ((Y/Yn)^{\frac{1}{3}} - (Z/Zn)^{\frac{1}{3}}) \quad (4)$$

Here, Xn, Yn and Zn are three values of the CIE 1931 standard colorimetric system for a perfect diffusion surface.

Next, in a step S2, a distance M1 (color difference) from a color of the objective color to a color having a desired lightness on the achromatic color axis (hereinafter referred to as "desired achromatic color") in the CIE 1976 L*a*b* colorimetric system is obtained using the following equation.

$$M1 = ((L^* - L^{*'})^2 + a^{*2} + b^{*2})^{\frac{1}{2}} \quad (5)$$

Here, L*' is a L* value of the desired achromatic color in the CIE 1976 L*a*b* colorimetric system, and generally is 50 to 60. The coordinate of the achromatic color is (L*', 0, 0).

In a step S3, a distance M2 (color difference) from the desired achromatic color to a color which is at the boundary of the color-reproducible range (gamut) of the image outputting (recording) medium and which has the same hue and lightness direction to the desired achromatic color as those of the objective color to the desired achromatic color, is obtained by the following equations (6) to (8), and with reference to a table 1 which is previously obtained.

$$\theta = \arctan((L^* - L^{*'})/(a^{*2} + b^{*2})^{\frac{1}{2}}) \quad (6)$$

$$\phi = \arctan(b^*/a^*) \quad (7)$$

$$M2 = \text{table1}(\theta)(\phi) \quad (8)$$

Figure 7:
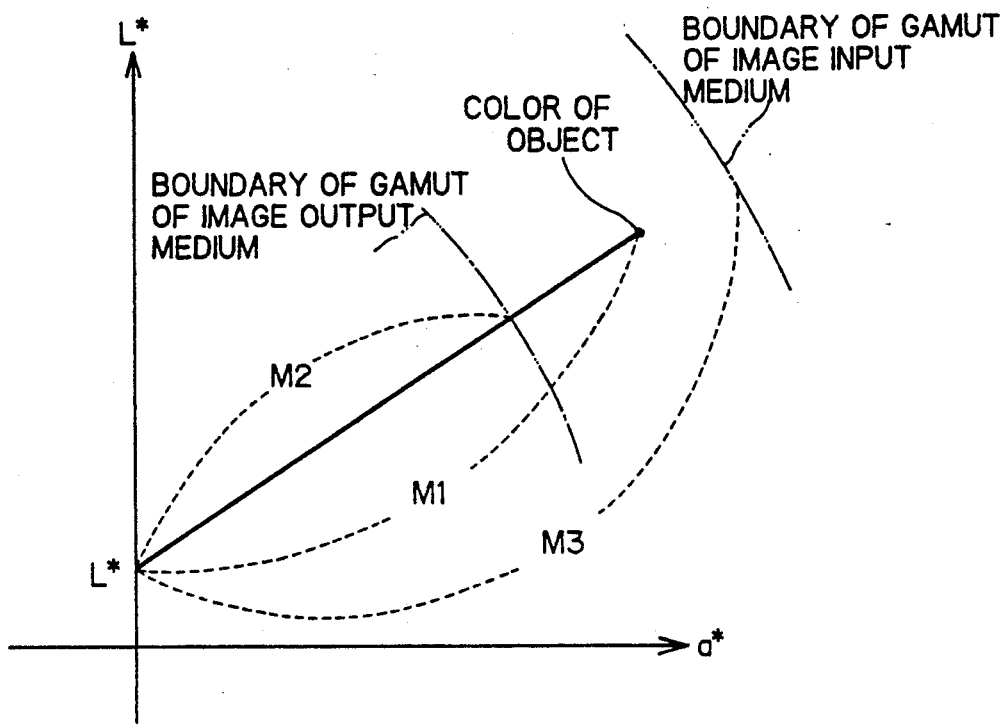
FIG. 7 is a schematic diagram for showing a distance from a color of an objective color or noted picture element to an achromatic color on an achromatic color axis.

In a step S4, a distance M3 (color difference) from the desired achromatic color to a color which is at the boundary of the color-reproducible range (gamut) of the image inputting system selected by one of the original-selecting buttons 41 to 44 and which has the same hue and lightness direction to the desired achromatic color as those of the objective color to the desired achromatic color is also obtained by the above equations (6) to (8), and with reference to a table 2 which is previously obtained. The value M3 is changed in accordance with the kind of the image input medium. FIG. 7 is a schematic diagram for showing the relationship between the distances M1, M2 and M3 in the CIE 1976 L*a*b* colorimetric system.

Figure 8:
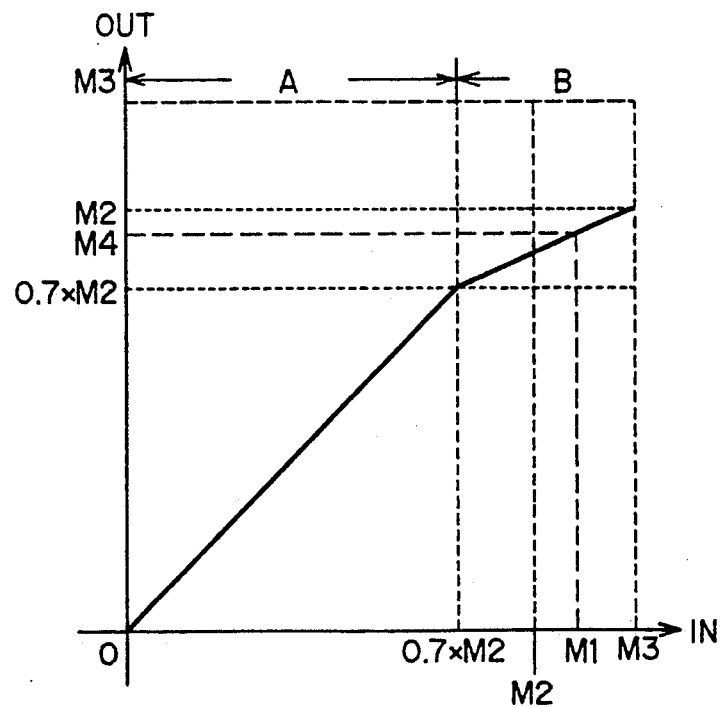
FIG. 8 is a schematic diagram for showing a color-compression transforming of the objective color or the noted picture element.

FIG. 8 is a schematic diagram for showing a color-compression relationship. In a step S5, it is judged that the objective color is located within a color-reproducible range (gamut) A which has a distance from 0 to a predetermined distance (color difference). In this embodiment, the predetermined distance is preferably set to 0.7×M2. If it is judged that the objective color is within the color-reproducible range (gamut) A, a color-compression processing is not conducted on the objective picture element. On the other hand, if it is judged that the objective color is out of the color-reproducible range A (that is, within a color-reproducible range (gamut) B), the objective color is subjected to the following color-compression processing to obtain a new distance M4 from the color-compressed (color corrected) objective color to the achromatic color.

$$M4 = M2 - ((0.3 \times M2)/(M3 - 0.7 \times M2)) \times (M3 - M1) \quad (9)$$

In a step S7, a value of (L*, a*, b*) in the CIE 1976 L*a*b* colorimetric system for the objective color which needs the color-compression processing is renewed to the following value of (L*2, a*2, b*2) in the CIE 1976 L*a*b* colorimetric system.

$$L^*2 = (L^* - L^{*'}) \times M4/M1 + L^{*'} \quad (10)$$

$$a^*2 = a^* \times M4/M1 \quad (11)$$

$$b^*2 = b^* \times M4/M1 \quad (12)$$

In a step S8, this final color-compressed value is reconverted to a color-compressed RGB image data (this color-compressed RGB image data has the same hue as the original RGB image data).

In a step S9, a control signal for recording the color-compressed RGB image data is stored as a control signal for the objective color. The above process is repeated until all of the colors at the lattice points of the lattice space and the control signals therefor are obtained for all of the kinds of originals which can be selected by the original selecting buttons 41 to 44, and then all of the data are stored in the ROM 20.

An original color image has an inherent ratio of a recordable color and a unrecordable color by the recording means (an inherent ratio of color regions which can be recorded by the recording means and other color regions which can not be recorded by the recording means), and an inherent degree of unrecordable color for every original color image. That is, each of the original color images has an inherent color distribution and thus a different color distribution from each other. The compression technique as described above subjects all of the original images to the predetermined compression process utilizing the color-correcting data irrespective of the difference of the color distribution of each original color image, and thus causes some original images to be reproduced with insufficient contrast due to an excessive color-compression or to be reproduced with saturation colors due to insufficient color-compression, with the result that a sufficient color reproducibility is not obtained.

The following second embodiment overcomes the above disadvantage, and attains an excellent color reproducibility for any kind of originals having various color distribution.

FIG. 9 shows a second embodiment of the image recording apparatus in which the above disadvantage is overcome.

The image recording apparatus of this embodiment includes an input means 51 for inputting a color information signal corresponding to a color of a color original, a recording means 52 for carrying out a color recording process using at least three coloring materials of cyan, magenta and yellow, a storing means 53 for storing combination data of colors to be recorded by the recording means 52 and control signals for actuating and controlling the recording means 52, a color correcting means 54 for obtaining a suitable control signal for the recording means 52 on the basis of the combination data stored in the storing means 53 in such a manner that a color to be recorded by the recording means 52 is substantially the same as a color of the input color information signal when the color information signal input through the input means starts the actuation of the recording means 52, and a pre-scanning means 55 for preliminarily scanning (pre-scanning) the color original prior to a main scanning operation to thereby obtain information on a color distribution, wherein the storing means 53 stores plural combination data of the colors to be recorded and the control signals therefor in accordance with the color distribution information of the color original independently of or in combination with the combination data which is dependent on a kind of an image inputting medium, and the color correcting means 54 includes a selecting means 56 for selecting a desired combination data from the combination data stored in the storing means in accordance with the color distribution information obtained by the pre-scanning means 55.

The combination data stored in the storing means 53 may be plural combination data of both of original (input) color information signals and control signals for controlling the recording means 52 to record colors of color information signals which are obtained by subjecting the original color information signals to a color-compression process in the achromatic direction in a different manner or at a different degree in accordance with the color distribution information of the original which is obtained by the pre-scanning means 55, the colors being recordable by the recording means 52.

In the image recording apparatus thus constructed, the color original is first pre-scanned by the pre-scanning means 55 to input a rough color distribution information of the color original. Thereafter, the color information of the color original is input for every picture element by the input means 51, the combination data on the color information signals and the control signals for the recording means which are stored in the recording means 52 are selected for plural colors by the selecting means 56, a control signal for the recording means 52, which is matched with the input color information signal, is interpolatively obtained on the basis of the selected combination data, and a recording process is carried out using cyan, magenta and yellow inks or toners by the recording means 52 in accordance with the obtained control signal.

The construction of the image recording apparatus and the color image processing unit 3 are substantially the same as those of the first embodiment as shown in FIGS. 3 and 5, except for a storing content of the ROM 20, and thus the description of the same elements is eliminated from the following description.

In this embodiment, compression coefficients of the compression processing which are different in a compressing manner and a degree of the compression are previously obtained in accordance with color distribution information of the original, as described below, and then colors to be recorded and control signals therefor are obtained on the basis of the compression processing whose compression coefficients are dependent on the color distribution information of the originals. The plural combination data of the colors and the control signals thus obtained are stored in the ROM 20 of the image processing unit 3.

Figure 10A:
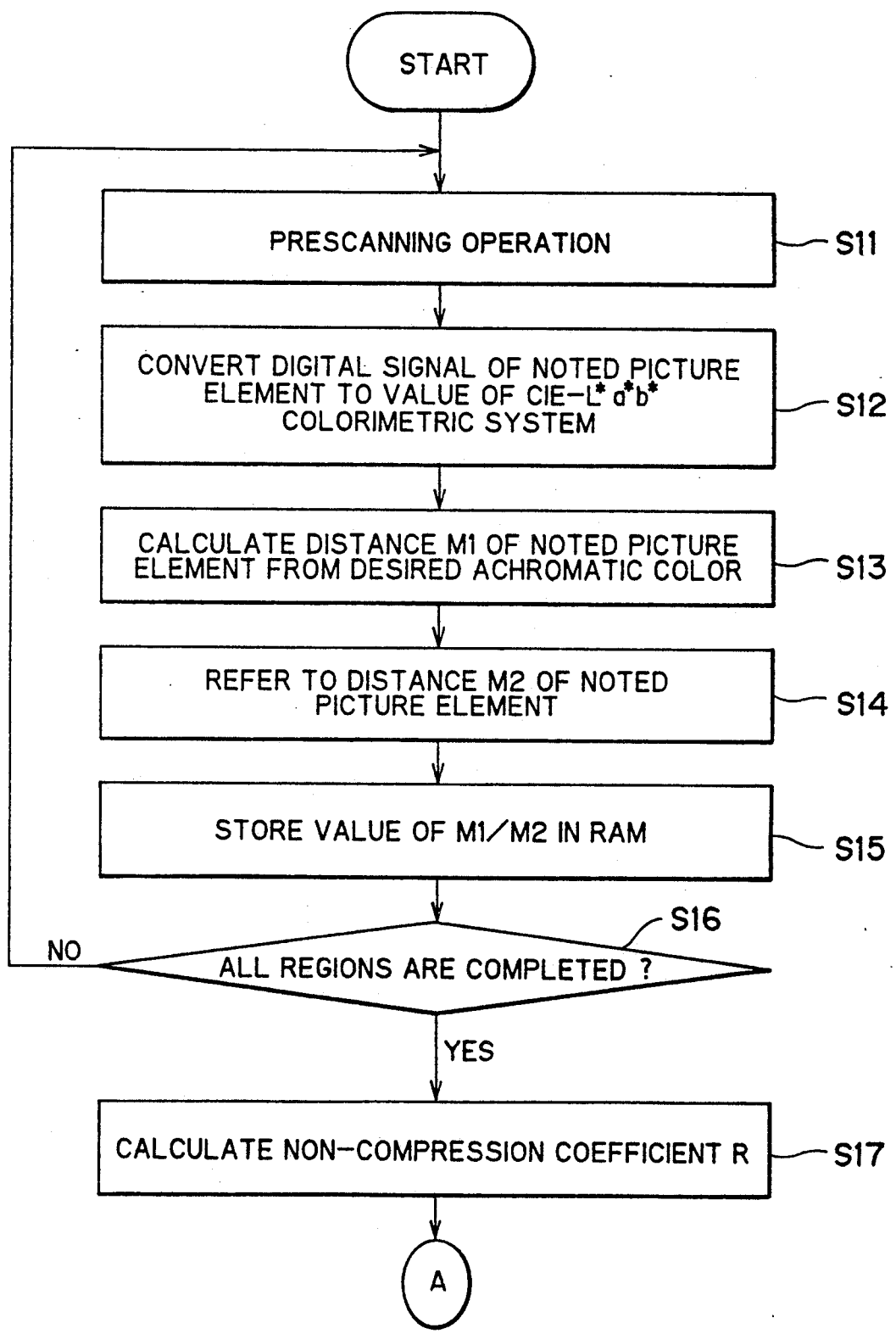
FIG. 10(A) is a flowchart for obtaining a color distribution of an original color image using a prescanning operation in the second embodiment.
Figure 10B:
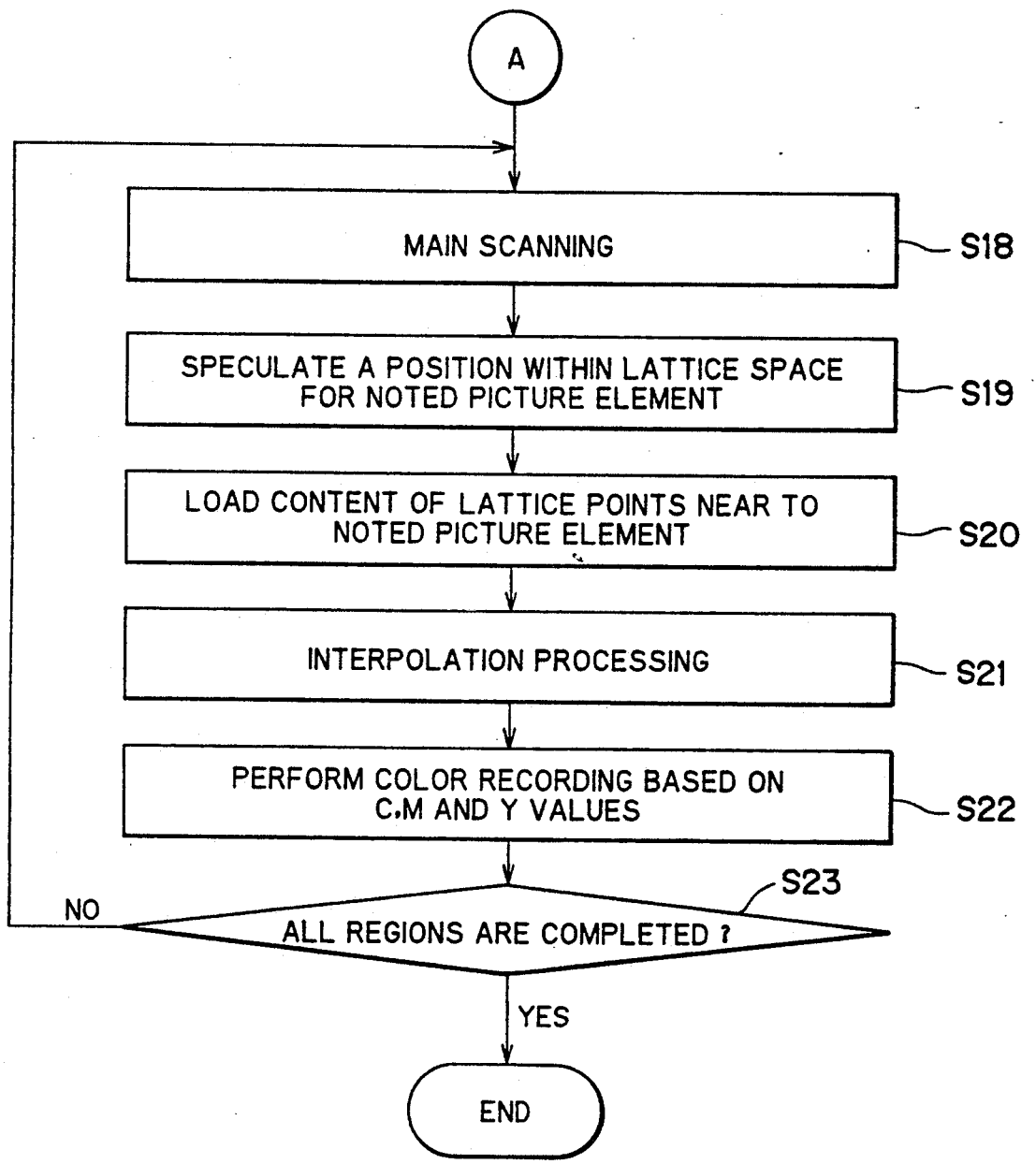
FIG. 10(B) is a flowchart for an interpolative processing in the second embodiment.
Figure 11:
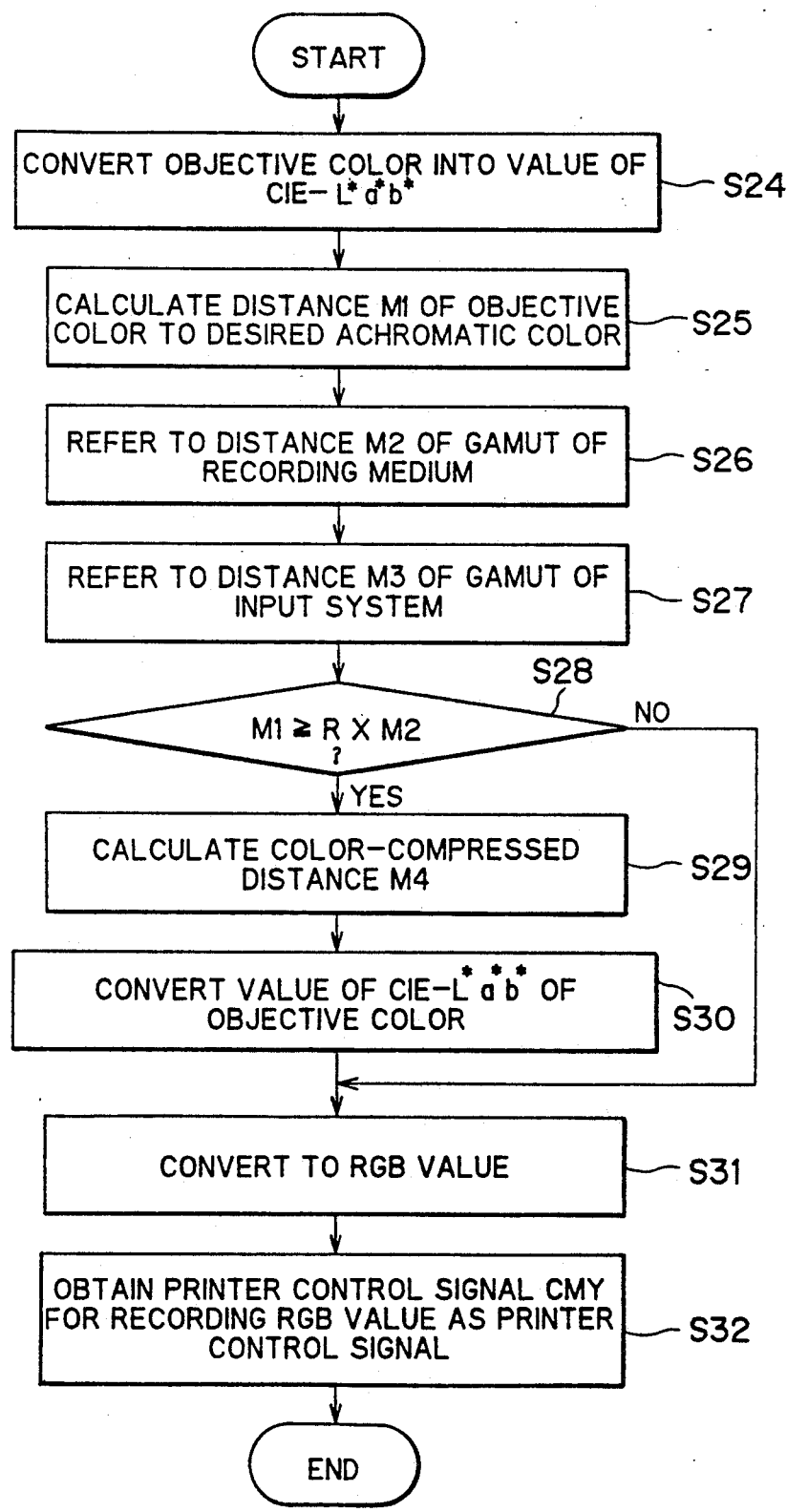
FIG. 11 is a flowchart for a color-correcting process using the color distribution information in the second embodiment.

A color correcting operation including a prescanning operation of the digital color copying machine of this embodiment will be described hereunder with reference to flowcharts of FIGS. 10(A) and 10(B).

The color original on the original supply stand 14 is fed onto the transparent original mount 5 by the original feeding unit 16. Otherwise, the original cover 6 is opened and the color original may be directly placed on the transparent original stand 5. In this state, a prescanning operation is first carried out to obtain a color distribution information of the color original in a step S11. In this prescanning operation, the color distribution information of the color original is read out while skippingly sampling some of picture elements in an auxiliary scanning direction in a moving operation in which the fluorescent lamp 7 serving as the scanning light source and so on are moved in the auxiliary scanning direction by the light source moving unit 9. The white light emitted from the fluorescent lamp 7 is reflected from the movable reflection mirror 8 and passed through the lens 11 and the filter unit 12 to the solid-state image pickup element 13 to be converted into electrical signals. Similarly in the first embodiment, the filter unit 12 are separated into three color filters of red, green and blue for passing red, green and blue light components, respectively. One of the red, green and blue filters are alternately selected every line in a main scanning direction while moving the movable stand 10 by the light source moving unit 9. For example, the red, green and blue filters are alternately selected in this order.

Analog signals obtained by the solid-state image pickup element 13 are converted into digital color signals for skippingly sampled picture elements (hereinafter referred to as "noted picture elements"), and then stored in the original storing unit (image memory) 19.

Next, a color distribution of the color original in the color space is speculated on the basis of the information obtained through the prescanning operation. That is, in a step S12, the digital signal of each noted picture element is converted into a value of the CIE-L*a*b* colorimetric system. In this case, as described in the first embodiment, if the Luther condition is satisfied for the image reading unit, an input color (RGB color signals) can be linearly converted into a value in the CIE-XYZ colorimetric system. Further, the value (X,Y,Z) in the CIE-XYZ colorimetric system can be converted into a value (L*, a*, b*) in the CIE-L*a*b* colorimetric system by the above-described equations (2), (3) and (4). Further, in a step S13, a distance M1 (color difference) from a color of the noted picture element to a color having a desired lightness on the achromatic color axis (hereinafter referred to as "a desired achromatic color L*') in the CIE-L*a*b* colorimetric system is obtained using the equation (5) as described above, where the desired achromatic color L*' is a point on the L* axis, and generally is a value from 50 to 60. Similarly, using the equations (6) to (8), the distance M2 is obtained in a step S14.

Next, a ratio of M1 to M2 (M1/M2) is stored in the RAM 21. The above process is repeated until all of the regions of the original is prescanned (in a step S16) to obtain the values of M1/M2 for all of the noted picture elements which have been obtained through the prescanning operation. Therefore, a non-compression coefficient R is obtained on the basis of the values of M1/M2 in a step S17 using the following equation (13).

$$R = 2.0 - \sum_{i}^{n} (M1i/M2i)/n \qquad (13)$$

Here, $1.0 > R > 0$, and n represents a number of pre-scanned picture elements.

One combination data of plural control signals and input colors which have been previously formed using various non-compression coefficients R and stored in the ROM 20 is selected. The combination data stored in the ROM 20 corresponds to a control signal which is located at a lattice point assigned to three color components of a color to be recorded, as described in the first embodiment.

Next, a main scanning operation is carried out in a step S18. In the main scanning operation, the fluorescent lamp 7 and so on are continuously moved in the auxiliary scanning direction by the light source moving unit 9. The white light emitted from the fluorescent lamp 7 is reflected from the movable reflection mirror 8 and passed through the lens 11 and the filter unit 12 to the solid-state image pickup element 13 to be converted into electrical signals.

Analog signals obtained by the solid-state image pickup element 13 are converted into corresponding digital color signal for every picture element (noted picture element), and stored in the original storing unit (image memory) 19. Thereafter, in a step S19, the position of a color represented by each digital color signal in the lattice space is calculated for the stored noted picture elements. In a step S20, the control signals assigned to colors at lattice points which surround the color of the noted picture element in the lattice space are read out of the ROM 20, and the control signal for the color of the noted picture element is interpolatively obtained using these control signals by the equation (1) as described above.

Similarly in the first embodiment, the printer control signal for each color component which has been obtained through the color-correcting processing is supplied to the laser control unit 24, to emit a laser beam in accordance with the control signal. The laser beam is reflected from the polygon mirror 25, and irradiated to a surface of the photosensitive drum which is homogeneously charged by the charging unit 28, thereby forming a latent image on the photosensitive drum 27. The latent image is supplied with toners by one of the cyan developer 29, the magenta developer 30 and the yellow developer 31 in accordance with separated three color components, so that the latent image is developed into a toner image. A recording sheet which has been supplied from the sheet supply case 36 is wound around the transfer drum 37, and the toner image on the photosensitive drum is transferred onto the recording sheet. A residual toner on the photosensitive drum 27 is removed by the cleaner 35. The recording sheet having the transferred toner image is heat-fixed by the heat-fixing unit 38 by way of the sheet feeding operation of the sheet feeding unit 40, and then discharged to the output tray 39.

An operation of forming combination data of input colors and control signals therefor which should be stored in the ROM 20 will be described hereunder.

The concept of the lattice space as described in the first embodiment is also provided in the second embodiment, and an input color is referred to as "an objective color". First, in the same manner as described in the first embodiment, the objective color is converted into a value of the CIE-L*a*b* colorimetric system by means of the equations (1) to (3) in a step S24. In steps S25, S26 and S27 distances M1, M2 and M3 for the objective color also are calculated using the equations (5) to (8) and the tables 1 and 2 as described above.

Next, in a step S28 it is judged whether the distance M1 of the objective color from the desired achromatic color is equal or greater than a value of the distance M2 multiplied by the non-compression coefficient R. If it is judged that the M1 is less than the value (R×M2), no color compression conversion is conducted on the objective color. If it is judged that the M1 is equal or greater than the value (R×M2), the color compressing operation is conducted on the objective color to obtain a distance M4 of the objective color to obtain a distance M4 of the color-compressed objective color from the desired achromatic color by the following equation (14) in a step S29.

$$M4 = M2 - (1.0 - R) \times M2/(M3 - R \times M2) \times (M2 - M1) \qquad (14)$$

Thereafter, the value (L*, a*, b*) in the CIE-L*a*b* colorimetric system for the objective color is converted into a value (L*, a*, b*) by the following equations (15) to (17) in a step S30

$$L^*_2 = ((L^* - L^{*\prime}) \times M4)/M1 + L^{*\prime} \qquad (15)$$

$$a^*_2 = a^* \times M4/M1 \qquad (16)$$

$$b^*_2 = b^* \times M4/M1 \qquad (17)$$

Thereafter, the above value ($L^*_2$, $a^*_2$, $b^*_2$) is reconverted into an RGB value of the original color system for a scanner input in a step S31. Further, a printer control signal for recording a color of the above RGB value is indicated as a control signal for the objective color in a step S32.

The above processing is repeated for all of colors at the lattice points in the lattice space and for the non-compression coefficients R of 0.0, 0.2, 0.4, 0.6, 0.8 and 1.0, and then the combination data of all of the control signals and the colors thus color-corrected are beforehand stored in the ROM 20. Of course, when an input color is not located at a lattice point, the control signal for the input color is interpolatively calculated in the same manner as described above.

As described above, the color original image is pre-scanned to speculate the color distribution, to thereby obtain a suitable control signal which is obtained through the color compression processing using a color compression coefficient suitable for the color distribution, so that a suitable color correction is constantly carried out irrespective of difference in color distribution of the original image, and the original color image can be recorded or reproduced with excellent color reproducibility.

This invention is not limited to the above embodiments, however, any modification may be made to the above embodiments without departing from the subject matter of this invention. For example, a manner of obtaining the combination data of color-compressed colors and control signals which are stored in the ROM 20 is not limited to the above manner. Further, the above embodiments are described representatively in a digital color copying machine, however, this invention may be applied to a color printer having no color original reading unit. Still further, the above embodiments adopt cyan, magenta and yellow color recording process, however, a black color may be added to these three colors to perform the color recording process.

What is claimed is:

1. An image forming apparatus for obtaining color image data representing each color of an actual original color image formed on an actual image input medium and forming, on an image output medium, a color image corresponding to the actual original color image, the image input medium having a first gamut and the image output medium having a second gamut, the first and second gamuts being defined as reproducible ranges of the image input medium and the image output medium, respectively, said image forming apparatus comprising:

image input means for inputting color image data representative of a color of each picture element of an actual original color image formed on an actual image input medium, the color represented by the color image being positioned within the first gamut;

storing means for storing a plurality of groups of combination data, each of said plurality of groups including plural combination data comprising color data to be inputted by said image input means and a record signal corresponding to the color data, the color data of the plural combination data representing an arbitrary color formable on an image input medium and the record signal of the plural combination data representing a color which is to be formed on an image output medium to produce a color corresponding to the arbitrary color on the image input medium, the arbitrary color represented by the color data being positioned within the first gamut and the color represented by the corresponding record signal being positioned within the second gamut, each of the plurality of groups of combination data being calculated with respect to at least one of plural color distributions and plural kinds of image input media, each f the record signal in each of the plurality of groups of combination data being calculated by selectively color-compressing the corresponding color data in a manner dependent on the corresponding at least one of a color distribution and a kind of an image input medium;

selecting means for selecting one of the plurality of groups of combination data in accordance with information on the corresponding at least one of a color distribution of the actual original color image and a kind of actual image input medium;

color processing means for processing at least one record signal of the selected one group of combination data to thereby produce a control signal, the control signal representing a color which corresponds to the color represented by the color image data and which is positioned within the second gamut; and image recording means for recording, on a basis of the control signal, the color represented by the control signal on the image output medium, to thereby record on the image output medium a color image corresponding to the actual original color image.

2. The image forming apparatus as claimed in claim 1, wherein said color processing means interpolatively calculates the control signal based on at least two record signals of the selected one group of combination data.

3. The image forming apparatus as claimed in claim 1, wherein the plurality of groups of combination data stored in said storing means are calculated with respect to plural color distributions of image input media, each of the record signals in each of the plurality of groups of combination data being calculated by selectively color-compressing the corresponding color data in a manner dependent on the corresponding color distribution of an image input medium, and wherein said selecting means selects one of the plurality of groups of combination data in accordance with information on color distribution of the actual original color image of the actual image input medium, and further comprising prescanning means for prescanning the actual original color image on the actual image input medium to obtain information on the color distribution of the actual original color image.

4. The image forming apparatus as claimed in claim 1, wherein said image input means comprises scanning means for optically scanning the actual original color image on the actual image input medium to obtain optical image data and photoelectric converting means for converting the optical image data into the color image data.

5. The image forming apparatus as claimed in claim 1, wherein said image recording means comprises an electrophotographic means using cyan, magenta and yellow coloring materials.

6. The image forming apparatus as claimed in claim 1, wherein the plurality of groups of combination data stored in said storing means are calculated with respect to plural kinds of image input media, each of the record signals in each of the plurality of groups of combination data being calculated by selectively color-compressing the corresponding color data in a manner dependent on the corresponding kind of image input medium, and wherein said selecting means selects one of the plurality of groups of combination data in accordance with information on a kind of actual image input medium, and wherein said selecting means includes image input medium selecting means for selecting the kind of actual image input medium out of the plurality of kinds of image input media.

7. The image forming apparatus as claimed in claim 1, wherein each of the record signals of each of the plurality of groups of the combination data stored in said storing means is determined by color-compressing the corresponding color data in the case where a color represented by the corresponding color data is positioned out of the second gamut which has a predetermined achromatic color at a center thereof and a boundary having a predetermined color difference from the center thereto in a color space.

8. The image forming apparatus as claimed in claim 1, wherein each of the record signals of each of the plurality of groups of the combination data stored in said storing means is determined in such a manner that a first color-difference M1 defined between a color represented by the color data and a predetermined achromatic color is determined, said image forming apparats further comprising judging means for judging whether the color-difference M1 is within a predetermined color-difference, and a corrected color-difference calculating means for calculating a corrected color-difference M4 from the first color-difference M1 to generate correcting color data which has a corrected color-difference M4 from the predetermined achromatic color, wherein when said judging means judges that the first color-difference M1 is out of the predetermined color-difference, the corrected color difference M4 being determined based on the first color difference M1 and further on a second color-difference M2 defined between a boundary of the second gamut and the predetermined achromatic color and third color-difference M3 defined between a boundary of the first gamut and the predetermined achromatic color, the record signal is obtained based on the color data when the first color-difference M1 is within the predetermined color-difference and based on the corrected color data when the first color-difference M1 is out of the predetermined color difference.

9. The image forming apparatus as claimed in claim 6, wherein each of the record signals of each of the plurality of groups of the combination data stored in said storing means is determined in such a manner that a first color-difference M1 defined between a color represented by the color data and a predetermined achromatic color is determined, a second color-difference M2 defined between a boundary of the second gamut and the predetermined achromatic color is set, a third color-difference M3 defined between a boundary of the first gamut of the corresponding kind of the image input medium and the predetermined achromatic color is set, said image forming apparatus further comprising judging means for judging whether the color-difference M1 is within a predetermined color-difference having a value of 0.7×M2 and calculating means for calculating a corrected color-difference M4 from the first color-difference M1 to generate corrected color data which has the corrected color-difference M4 from the predetermined achromatic color, wherein when said judging means judges that the first color-difference M1 is out of the predetermined color-difference, the corrected color difference M4 being determined based on the first color difference M1 and further on the second color-difference M2 and the third color-difference M3, the second signal is obtained based on the color data when the first color-difference M1 is within the predetermined color-difference and based on the corrected color data when the first color-difference M1 is out of the predetermined color-difference.

10. The image forming apparatus as in claim 3, wherein each of the record signals of each of the plurality of groups of the combination data stored in said storing means is determined in such a manner that a first color-difference M1 defined between a color represented by the color data and a predetermined achromatic color is determined, a second color-difference M2 defined between a boundary of the second gamut and the predetermined achromatic color is set, a third color-difference M3 defined between a boundary of the first gamut and the predetermined achromatic color is set, said image forming apparatus further comprising judging means for judging whether the color-difference M1 is within a predetermined color-difference having a value of R×M2, the value of R being representative of a non-compression coefficient which is determined dependently on the corresponding color distribution of the image input medium, a calculating means for calculating a corrected color-difference M4 from the first color-difference M1 to generate corrected color data which has the corrected color-difference M4 from the predetermined achromatic color, wherein when said judging means judges that the first color-difference M1 is out of the predetermined color-difference, the corrected color difference M4 being determined based on the first color difference M1 and further on the second color-difference M2, the third color-difference M3 and the value of R, the record signal is obtained based on the color data when the first color-difference M1 is within the predetermined color-difference and based on the corrected color data when the first color-difference M1 is out of the predetermined color-difference, and wherein said prescanning means comprises means for sampling at lest one picture element of the actual original color image on the actual image input medium to obtain prescan color data and means for calculating a ratio of the color-difference M1 between the prescan color data and the predetermined achromatic color with respect to the color difference M2 to obtain an actual non-compression coefficient R which to obtain an actual non-compression coefficient R which represents the color distribution of the actual original color image.

11. The image forming apparatus as claimed in claim 10, wherein the plurality of groups of combination data stored in said storing means is calculated with respect to the values of R of 0.0, 0.2, 0.4, 0.6, 0.8 and 1.0, respectively, and wherein said selecting means includes means for judging which one of the value of R of 0.0, 0.2, 0.4, 0.6, 0.8 and 1.0 is equal to the actual non-compression coefficient obtained by said prescanning means.

12. An image forming apparatus for obtaining color image data representing each color of an actual original color image formed on an actual image input medium and forming, on an image output medium, a color image corresponding to the actual original color image, the image input medium having a first gamut and the image output medium having a second gamut, the first and second gamuts being defined as reproducible ranges of the image input medium and the image output medium, respectively, said image forming apparatus comprising:

image input means for inputting color image data representative of a color of each picture element of an actual original color image formed on an actual image input medium, the color represented by the color image data being positioned within the first gamut;

storing means for storing a plurality of groups of combination data, each group including plural combination data comprising color data to be inputted by said image input means and a record signal corresponding to the color data, the color data of the plural combination data representing an arbitrary color formable on an image input medium and the record signal of the plural combination data representing a color which is to be formed on an image output medium to present a color identical to the arbitrary color on the image input medium, the arbitrary color represented by the color data being positioned within the first gamut and the color represented by the corresponding record signal being positioned within the second gamut, each of the plurality of groups of combination data being calculated with respect to at least one of a plurality of color distributions and plural kinds of image input media, each of the record signals in each of the plurality of groups of combination data being calculated by selectively color-compressing the corresponding color data in such a manner as determined dependently on the corresponding at least one of a color distribution and a kind of an image input medium;

selecting means for selecting one of the plurality of groups of combination data in accordance with information on the corresponding at least one of a color distribution of the actual original color image and a kind of the actual image input medium;

color processing means for processing at least one record signal of the selected one group of combination data to thereby produce a control signal, the control signal representing color which corresponds to the color represented by the color image data and which is positioned within the second gamut; and image recording means for recording, on a basis of the control signal, the color represented by the control signal on the image output medium, to thereby record on the image output medium a color image corresponding to the actual original color image;

wherein each of the record signals of each of the plurality of groups of the combination data stored in said storing means is determined by selectively color-compressing the corresponding color data in such a manner that the color data having at least one of a first and second relationship with the second gamut may be color-compressed, the first relationship being determined dependently on the corresponding color distribution and the second relationship being determined dependently on the corresponding kind of image input medium, to generate replacing color data and by calculating the record signal based on one of color data not selected by said selecting means and the replacing color data.

13. The image forming apparatus as claimed in claim 12, wherein each of the record signals of each of the plurality of groups of the combination data is determined by selectively color-compressing the corresponding color data in such a manner that such color data having a predetermined relationship with the second gamut may be color-compressed, the predetermined relationship being determined dependently on the corresponding color distribution of the image input medium to generate replacing color data and by calculating the record signal based on one of color data not selected by said selecting means and the replacing color data.

14. The image forming apparatus as claimed in claim 12, wherein each of the record signals of each of the plurality of groups of the combination data is determined by selectively color-compressing the corresponding color data in such manner that such color data having a predetermined relationship with the second gamut may be color-compressed, the predetermined relationship being determined dependently on the corresponding kind of the image input medium, to generate replacing color data and by calculating the record signal based on one of color data not selected by said selecting means and the replacing color data.

15. The image forming apparatus as claimed in claim 1, wherein each of the record signals of each of the plurality of groups of the combination data stored in said storing means is determined in such a manner that color represented by the corresponding color data is selectively shifted in a direction toward a predetermined achromatic color to produce replacing color data in such a manner that such color data having a color-distance from the predetermined achromatic color equal to or larger than a value obtained by multiplying a second color difference M2 defined between a boundary of the image output medium and the predetermined achromatic color by a predetermined value may be color-compressed with a color-compression degree which is determined dependently on the corresponding kind of image input medium and the record signal, is calculated based on one of the replacing color data and color data not selected by said selecting means.

16. The image forming apparatus as claimed in claim 1, wherein each of the record signals of each of the plurality of groups of the combination data stored in said storing means is determined in such a manner that a color represented by the corresponding color data is selectively shifted in a direction toward a predetermined achromatic color to produce replacing color data in such a manner that such color data having a color-distance from the predetermined achromatic color equal to or larger than a value obtained by multiplying a second color difference M2, defined between a boundary of the image output medium and the predetermined achromatic color, by a non-compression coefficient R representative of the corresponding color distribution of the image input medium may be color-compressed with a color-compression degree which is determined dependently on the corresponding color distribution of the image input medium and the record signal, is calculated based on one of the replacing color data and color data not selected by said selecting means.

17. The image forming apparatus as claimed in claim 6, wherein said selecting means includes image input medium input means for inputting the kind of the actual image input medium and judging means for judging which one of the plural kinds of image input medium stored in said judging means is the same as the kind of the actual image input medium inputted by said image input medium input means.

18. A color image forming apparatus for obtaining color image data representing each color of an original color image formed on an image input medium and forming, on an image output medium, a color image corresponding to the original color image, the image input medium and the image output medium having a first gamut and a second gamut, respectively, the first and second gamuts being defined as reproducible ranges of the image input medium and the image output medium, respectively, said color image forming apparats comprising:

image input means for inputting color image data representative of a color of each picture element of the original color image, the color of the each picture element thus represented by the color image data being positioned within of the first gamut;

control signal producing means for producing a control signal on a basis of the color image data, the control signal having a value corresponding to that obtained by selectively transforming the color image data in a color-compression manner which is determined dependently on information on at least one of a color distribution of the original color image and a kind of the image input medium, color represented by the control signal corresponding to the color of each picture element of the original color image and being positioned within the second gamut; and image recording means for recording, on a basis of the control signal, the color represented by the control signal on the image output medium, to thereby record, on the image output medium, a color image corresponding to the original color image, wherein said control signal producing means includes:

storing means for storing a plurality of groups of combination data, each group of the combination data including a plurality of color data inputtable by said input means and a plurality of record signals for controlling said image recording means to record, on the image output medium, colors corresponding to colors represented by the color data, the colors represented by the color data being positioned within the first gamut and the colors represented by the record signals being positioned within the second gamut, each of the plurality of groups of combination data corresponding to at least one of a plurality of color distributions and one of a plurality of image input media, each of the record signals of each of the groups of the combination data being obtained by selectively transforming the corresponding color data in a color-compression manner determined dependently on the corresponding at least one of a color distribution and a kind of image input medium;

selecting means for selecting one group of the plurality of groups of combination data in accordance with information on the corresponding at least one of a color distribution of the original color image and the kind of the image input medium; and color processing means for processing at least one record signal of the selected one group of combination data to thereby produce the control signal.

19. The image forming apparatus as claimed in claim 18, wherein the plurality of groups of combination data stored in said storing means are determined with respect to plural color distributions of image input media, each of the record signals in each of the plurality of groups of combination data being calculated by selectively color-compressing the corresponding color data in such a manner as determined dependently on the corresponding color distribution of an image input medium, and wherein said selecting means selects one of the plurality of groups of combination data in accordance with information on color distribution of the actual original color image of the actual image input medium, and further comprising prescanning means for prescanning the actual original color image on the actual image input medium to obtain information on the color distribution of the actual original color image.

20. The image forming apparatus as claimed in claim 19, wherein each of the record signals of each of the plurality of groups of the combination data stored in said storing means is determined in such a manner that a first color-difference M1 defined between a color represented by the color data and a predetermined achromatic color is calculated, a second color-difference M2 defined between a boundary of the second gamut and the predetermined achromatic color is set, a third color-difference M3 defined between a boundary of the first gamut and the predetermined achromatic color is set, said image forming apparatus further comprising judging means for judging whether the color-difference M1 is within a predetermined color-difference having a value of R×M2, the value of R being representative of a non-compression coefficient which is determined dependently on the corresponding color distribution of image input medium, and a calculating means for calculating a corrected color-difference M4 from the first color-difference M2 to generate corrected color data which has the corrected color-difference M4 from the predetermined achromatic color, and when said judging means judges that the first color-difference M1 is out of the predetermined color-difference, the corrected color difference M4 being determined based on the first color difference M1 and further on the second color-difference M2, the third color-difference M3 and the value of R, the record signal is obtained based on the color data when the first color-difference M1 is within the predetermined color-difference and based on the corrected color data when the first color-difference M1 is out of the predetermined color-difference, and wherein said prescanning means comprises means for sampling at least one picture element of the actual original color image on the actual image input medium to obtain prescan color data and means for calculating a ratio of the color-difference M1 between the prescan color data and the predetermined achromatic color with respect to the color difference M2 to obtain an actual non-compression coefficient R which represents the color distribution of the actual original color image.

21. The image forming apparatus as claimed in claim 18, wherein the plurality of groups of combination data stored in said storing means are determined with respect to plural kinds of image input media, each of the record signals in each of the plurality of groups of combination data being calculated by selectively color-compressing the corresponding color data in such a manner as determined dependently on the corresponding kind of image input medium, and wherein said selecting means selects one of the plurality of groups of combination data in accordance with information on a kind of the actual image input medium, and wherein said selecting means includes image input medium selecting means for selecting the kind of the actual image input medium out of the plurality of kinds of image input media.

22. The image forming apparatus as claimed in claim 21, wherein each of the record signals of each of the plurality of groups of the combination data stored in said storing means is determined in such a manner that a first color-difference M1 defined between a color represented by the color data and a predetermined achromatic color is calculated, a second color-difference M2 defined between a boundary of the second gamut and the predetermined achromatic color is set, a third color-difference M3 defined between a boundary of the first gamut of the corresponding kind of the image input medium and the predetermined achromatic color is set, said image forming apparatus further comprising judging means for judging whether the color-difference M1 is within a predetermined color-difference having a value of 0.7×M2, a calculating means for calculating a corrected color-difference M4 from the first color-difference M1 to generate corrected color data which has the corrected color-difference M4 from the predetermined achromatic color, wherein when said judging means judges that the first color-difference M1 is out of the predetermined color-difference, the corrected color difference M4 being determined based on the first color difference M1 and further on the second color-difference M2 and the third color-difference M3, the record signal is obtained based on the color data when the first color-difference M1 is within the predetermined color-difference and based on the corrected color data when the first color-difference M1 is out of the predetermined color-difference.

23. The image forming apparatus as claimed in claim 21, wherein said selecting means includes image input medium kind input means for inputting the kind of the actual image input medium and judging means for judging which one of the plural kinds of image input medium is the same as the kind of the actual image input medium inputted by said image input medium kind input means.

24. The image forming apparatus as claimed in claim 18, wherein each of the record signals of each of the plurality of groups of the combination data stored in said storing means is determined by selectively color-compressing the corresponding color data in such a manner that at least such color data having at least one of a first and second relationships with the second gamut bay be color-compressed, the first relationship being determined dependently on the corresponding color distribution and the second relationship being determined dependently on the corresponding kind of the image input medium, to generate replacing color data and by calculating the record signal based on one of color data not selected by said selecting means and the replacing color data.

25. The image forming apparatus as claimed in claim 24, wherein each of the record signals of each of the plurality of groups of the combination data is determined through selectively color-compressing the corresponding color data in such a manner that such color data having a predetermined relationship with the second gamut may be color-compressed, the predetermined relationship being determined dependently on the corresponding color distribution of the image input medium, to generate replacing color data and by calculating the record signal based on one of color data not selected by said selecting means and the replacing color data.

26. The image forming apparatus as claimed in claim 24, wherein each of the record signals of each of the plurality of groups of the combination data is determined through selectively color-compressing the corresponding color data in such a manner that such color data having a predetermined relationship with the second gamut may be color-compressed, the predetermined relationship being determined dependently on the corresponding kind of the image input medium, to generate replacing color data and by calculating the record signal based on one of color data not selected by said selecting means and the replacing color data.

27. The image forming apparatus as claimed in claim 18, wherein each of the record signals of each of the plurality of groups of the combination data stored in said storing means is determined in such a manner that color represented by the corresponding color data is selectively shifted in a direction toward a predetermined achromatic color to produce replacing color data in such a manner that such color data having a color-distance from the predetermined achromatic color equal to or larger than a value obtained by multiplying a second color difference M2 defined between a boundary of the image output medium and the predetermined achromatic color by a predetermined value may be color-compressed with a color-compression degree which is determined dependently on the corresponding kind of the image input medium and the record signal, is calculated based on one of the replacing color data and color data not selected by said selecting means.

28. The image forming apparatus as claimed in claim 18, wherein each of the record signals of each of the plurality of groups of the combination data stored in said storing means is determined in such a manner that a color represented by the corresponding color data is selectively shifted in a direction toward a predetermined achromatic color to produce replacing color data in such a manner that such color data having a color-distance from the predetermined achromatic color equal to or larger than a value obtained by multiplying a second color difference M2 defined between a boundary of the image output medium and the predetermined achromatic color by a non-compression coefficient R representative of the corresponding color distribution of the image output medium may be color-compressed with a color-compression degree which is determined dependently on the corresponding color distribution of the image input medium and the record signal is calculated based on one of the replacing color data and color data not selected by said selecting means.

* * * * *